Aug. 18, 1936.　　　　M. M. McCUMBER　　　　2,051,566
FRICTION DISK BRAKE
Original Filed Nov. 28, 1932　　3 Sheets-Sheet 1
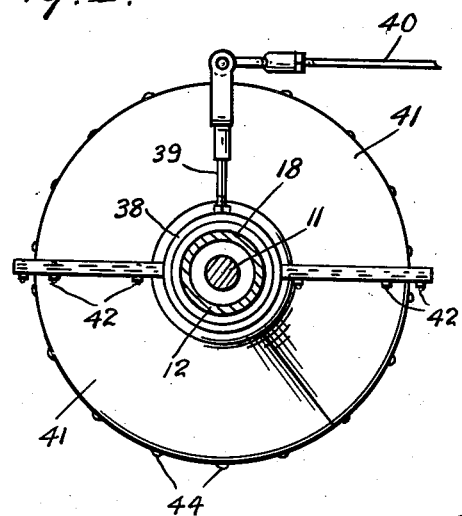
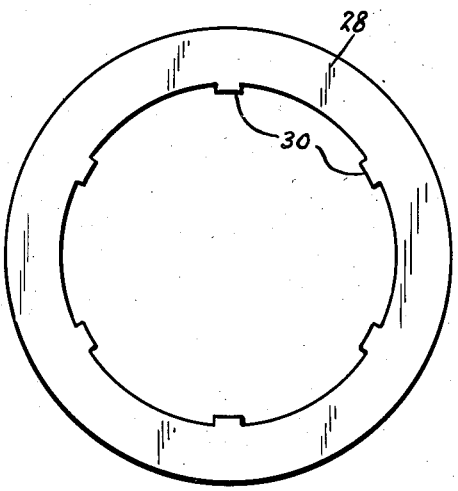
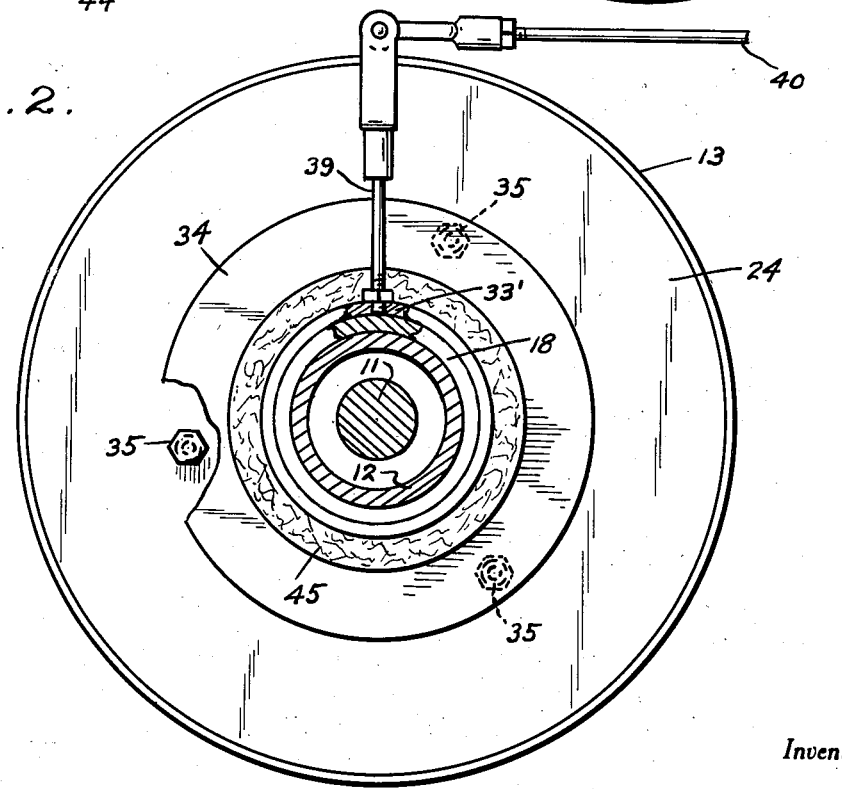
Inventor
Moses M. McCumber
By Clarence A. O'Brien
Attorney

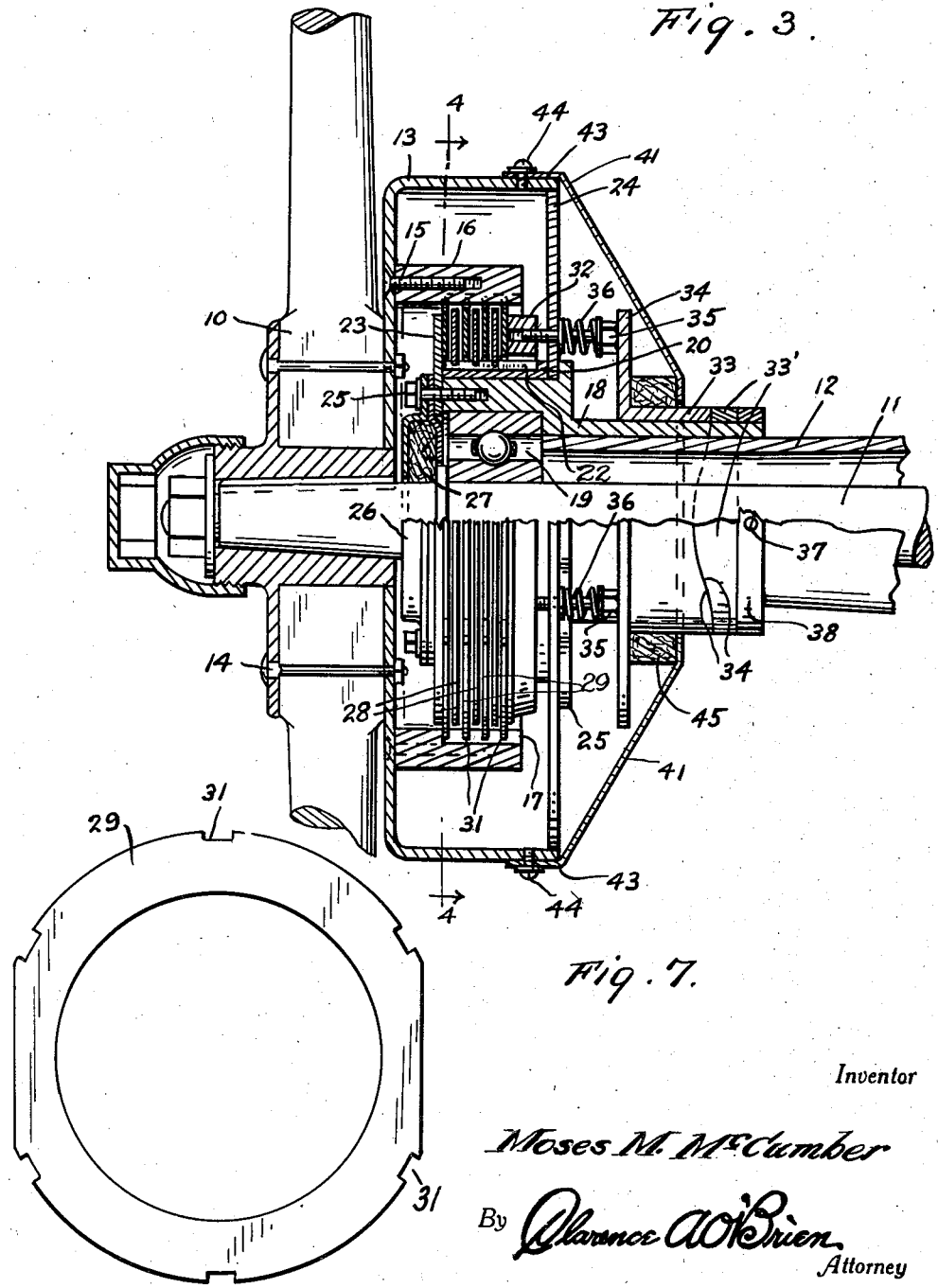

Aug. 18, 1936.                M. M. McCUMBER                2,051,566
                              FRICTION DISK BRAKE
                   Original Filed Nov. 28, 1932    3 Sheets-Sheet 3

Inventor

Moses M. McCumber

By Clarence A. O'Brien
                    Attorney

Patented Aug. 18, 1936

2,051,566

UNITED STATES PATENT OFFICE 2,051,566

FRICTION DISK BRAKE

Moses M. McCumber, Seminole, Okla.

Application November 28, 1932, Serial No. 644,715
Renewed May 26, 1936

1 Claim. (Cl. 188—72)

This invention relates broadly to vehicular wheel brakes and aims to provide an improved friction disk brake for automobile wheels and the like.

In accordance with the present invention a friction disk brake for vehicular wheels is provided, which will require little or no adjustments, is free of brake bands, and has provision for maintaining all the working parts thereof in a bath of oil, and otherwise in a well lubricated condition.

The invention together with its numerous objects and advantages will be best understood from an examination of the following description, taken in connection with the accompanying drawings wherein:

Figure 1 is an elevational view of the brake.

Figure 2 is an enlarged detail sectional elevational view thereof, the cover shield being removed.

Figure 3 is a sectional elevational view taken through the brake, the same being shown applied to a vehicle wheel.

Figure 6 is a plan view of one of the stationary friction disks and

Figure 7 is a similar view of a rotatable friction disk.

Figure 4:
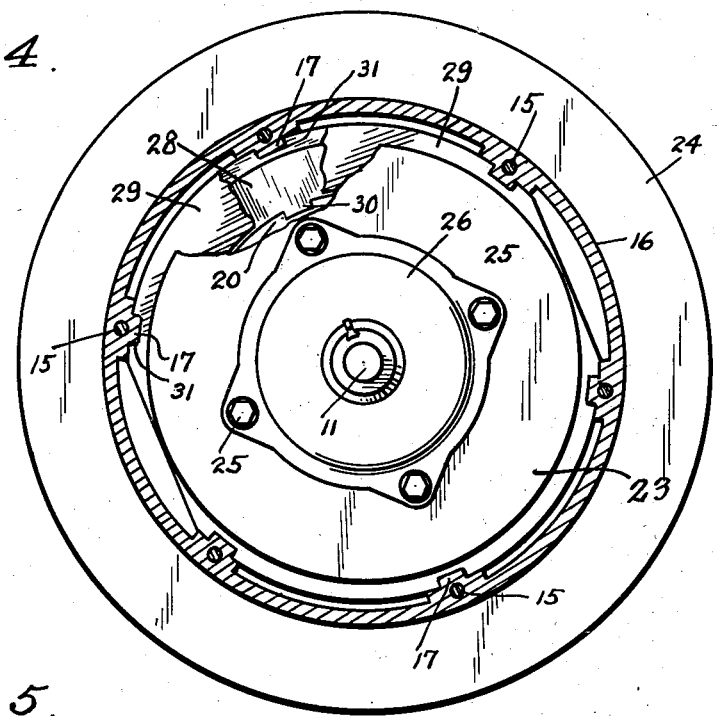
Figure 4 is a sectional view taken substantially on the line 4—4 of Figure 3.

Referring to the drawings by reference numerals it will be seen that I have shown the brake as applied to a conventional vehicle wheel of the spoke type, a portion of said wheel being shown in the drawings and designated by the reference character 10. The axle is designated by the reference character 11, while the axle housing is designated by the reference character 12. The brake drum is designated generally by the reference character 13 and is secured to the wheel 10 in a more or less conventional manner through the medium of the bolts 14. Fixedly secured within the brake drum 13 through the medium of screws 15 is an annular member 16 that is provided internally with a circular series of relatively spaced ribs or keys 17.

Figure 5:
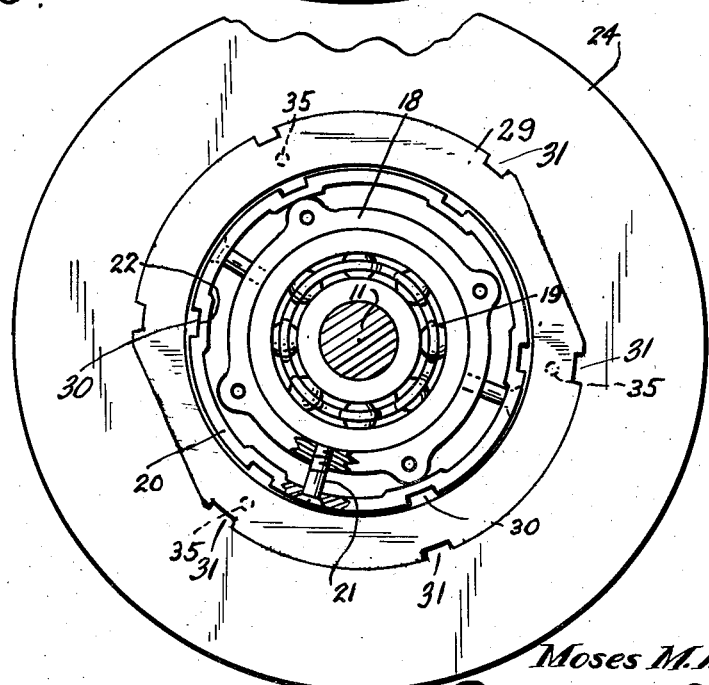
Figure 5 is an elevational view, with parts in section and with the brake drum and the parts carried thereby removed.

Arranged on the axle housing 12 is a fixed sleeve 18 that has one end extending inwardly of the annular member 16 and arranged within said end of the sleeve 18 is a bearing designated generally by the reference character 19. Disposed about said end of the sleeve 18 is a band or ring 20 that is secured against rotative movement relative to the sleeve 18 through the medium of screws 21 extending through the band 20 and having threaded engagement with the sleeve 18 as will be clear from a study of Figure 5. The band 20 is provided with a circular series of external grooves or keyways 22.

The ring 20 is also disposed between a relatively fixed brake disk 23 and a closure or partition disk 24 substantially entirely closing the open side of the drum 13. Disk 24 is disposed on the sleeve 18 and is confined between one end of the ring 20 and an annular integral flange or collar 25 provided on the inner end of the sleeve 18.

The brake disk 23 is disposed at the innermost end of the sleeve 18 and is secured in position through the medium of bolts 25.

Secured in position by the bolts 25 is a lubricant retainer that comprises a substantially annular sectional casing 26 the sections of which at the meeting ends thereof are provided with outstanding apertured flanges for accommodating the bolts 25 whereby the sections are secured in assembled position, and as aforementioned, the lubricant retainer is secured in position at the inner end of the sleeve 18. Arranged in the container 26 is an absorbent pad 27 of felt or the like that extends snugly about the axle 11 as shown this retainer acts to prevent lubricant from escaping from the axle housing 12 into the brake drum. Arranged in the manner shown in Figure 3, are stationary friction disks 28, and rotatable friction disks 29. The disks 28 on their inner circular edges are provided with lugs 30 engaging the grooves or keyways 22 provided in ring 20, while the rotatable disks 29 are provided on their outer circular edges with notches 31 engaging the keys or ribs 17 provided internally of the member 16. It will thus be seen that the disks 28 will remain stationary, while the disks 29 will rotate with the brake drum 13.

For forcing the disks 28, 29 axially toward one another and into frictional engagement with one another and with the disk 23 to apply a braking action to the vehicle wheel 10, there is provided a ring like follower member 32 disposed concentric to the ring 20 and adapted to engage the adjacent endmost disk 29. Shiftably mounted on the sleeve 18 is an actuating collar 33 that is provided at one end with a flange 34 engaged with one end of a series of bolts 35 slidable through suitable apertures provided in the disk plate 24 and have threaded engagement with the ring like follower 32 as shown in Figure 3. Disposed about the bolts 35 are springs 36 disposed between the plate 24 and the heads of the bolts and these springs normally urge the bolts 35 to the left in Figure 3 as is apparent.

The collar 33 is split transversely to provide two sections the meeting edges of which are provided to form cam surfaces 34 which coact, upon rotation of collar section 33' relative to the sleeve 18, to force the flange equipped section of the collar 33 inwardly against the action of spring 36 for moving the disk 28, 29 into frictional engagement with one another for applying the brake. For limiting movement of the collar 33 under action of springs 36 there is secured by fastening elements 37, to the outer end of the member 18 a stop collar 38.

For rotating th section 33' of sleeve 33 there is suitably secured to the section 33', as shown in Figure 2, a yoke 39 that is pivotally connected to a brake rod, a portion of which is shown in the drawings and designated by the reference character 40.

To protect the bolts 35, springs 36 and flanged end of the collar 33 there is provided a cover or shield member formed of two sections 41, 41 which at their meeting edges are provided with flanges that are bolted together as at 42. The shield 41 is also provided with a flange 43 that is secured by screws or other fastening elements to the drum 13 as shown in Figure 3.

The operation of the invention is thought apparent from the foregoing. Normally the parts are in the position shown in Figure 3. When it is desired to apply the brake, the collar section 33' is rotated, as is thought apparent, thus forcing the flange section of the collar 33 inwardly or toward the wheel 10, resulting in the follower 32 being moved in a corresponding direction, and the follower 32 engaging the adjacent disk 29 will cause the disks 29 and 28 to move toward the disk 23 and to frictionally engage one with the other for applying a braking action to the wheel. To release the brake the operation is just the reverse; the collar section 33' is rotated in a reverse direction whereupon, under action of springs 36, the flanged section of collar 33 will move to the right in Figure 3 as will also the follower 32 permitting the disks 28, 29 to separate, and thereby leave the wheel free to rotate in the usual manner.

As shown in Figure 3 there is also provided a retainer ring 45 of felt or other suitable absorbent material, and this ring 45 is disposed about the flange equipped section of the collar 33 between the flange 34 and the shield or cover plate 41, this ring 45 acting to keep grease within the brake housing and preventing the grease from getting on the outer side of the axle housing. The member 45 will also serve to absorb the shock incident to a return of the flanged section of collar 33 to its normal or brake released position.

Even though I have herein shown and described the preferred embodiment of the invention, it is to be understood that the same is susceptible of further changes, modifications and improvements coming within the scope of the appended claim.

Having thus described my invention, what I claim as new is:

In combination with a shaft and its housing, a wheel carried by the shaft and a brake drum attached to the wheel; an annular member located in the drum and connected with the closed end of the drum which is connected with the wheel, internal longitudinally extending ribs on said annular member, a sleeve having a reduced part fitting over an end of the housing and connected therewith and having an enlarged part located in the drum, anti-friction bearings between said enlarged part and the axle, a fixed ring-shaped disk connected to the free end of the enlarged part of the sleeve and extending outwardly therefrom and terminating short of the annular member, a ring surrounding the enlarged part of the sleeve and having spaced notches in its outer circumference, one end of the ring abutting the ring-shaped disk, a cover plate for the open end of the drum attached to the outer part of the enlarged portion of the sleeve and against which the other end of the ring abuts, a plurality of friction disks having lugs on their inner circumferences, said lugs engaging the notches in the ring, a plurality of friction disks having notches in their outer circumferences receiving the ribs on the annular member, the last mentioned friction disks extending between the first mentioned friction disks with one of the second mentioned friction disks located between the fixed ring-shaped disk and the adjacent first mentioned friction disk, a follower ring for engaging that friction disk carried by the annular member which is closest to the closure plate, bolts passing through holes in the closure plate and threaded to the follower ring, springs on said bolts located between the heads of the bolts and the closure plate, a collar slidably arranged on the reduced part of the sleeve and having a flange for engaging the bolt heads, the outer end of the collar being of cam shape, a cam ring rotatably arranged on the reduced part of the sleeve and engaging the cam end of the collar, means for rotating the cam ring for imparting sliding movement to the collar.

MOSES M. McCUMBER.